US005382966A

United States Patent [19]
Doi

[11] Patent Number: 5,382,966

[45] Date of Patent: Jan. 17, 1995

[54] EXPOSURE HEAD FOR IMAGE RECORDING APPARATUS

[75] Inventor: Atsuhiro Doi, Kanagawa, Japan

[73] Assignee: Fuji Photo Film Co., Ltd., Kanagawa, Japan

[21] Appl. No.: 894,740

[22] Filed: Jun. 5, 1992

Related U.S. Application Data

[63] Continuation of Ser. No. 323,909, Mar. 15, 1989, Pat. No. 5,170,180.

[30] Foreign Application Priority Data

| | | | |
|---|---|---|---|
| Mar. 15, 1988 | [JP] | Japan | 63-061612 |
| Mar. 15, 1988 | [JP] | Japan | 63-061613 |
| Mar. 16, 1988 | [JP] | Japan | 63-035358[U] |
| Mar. 16, 1988 | [JP] | Japan | 63-035359[U] |
| Mar. 16, 1988 | [JP] | Japan | 63-064034 |

[51] Int. Cl.⁶ .......... B41T 2/45; G01D 15/14

[52] U.S. Cl. .......... 346/107 R; 346/108

[58] Field of Search .......... 346/107 R, 108, 160; 350/174; 358/302; 174/260; 361/404, 406; 355/228, 232; 29/842, 843, 844, 845; 439/924; 219/121.6; 359/618, 640

[56] References Cited

U.S. PATENT DOCUMENTS

| | | | |
|---|---|---|---|
| 905,802 | 12/1908 | Drac | 359/64 |
| 1,839,361 | 1/1932 | Weaver et al. | 346/108 X |
| 3,447,575 | 6/1969 | Johanson | 174/260 X |
| 3,506,779 | 4/1970 | Brown et al. | 219/121.62 X |
| 4,549,036 | 10/1985 | Reichbach | 439/924 X |
| 4,562,462 | 12/1985 | Egan | 346/108 X |
| 4,566,170 | 1/1986 | Dolan | 346/107 R X |
| 4,672,258 | 6/1987 | Konishi | 346/108 X |
| 4,780,730 | 10/1988 | Dodge et al. | 346/108 |
| 4,797,691 | 1/1989 | Akiyoshi et al. | 346/108 |
| 4,879,633 | 11/1989 | Kaufman | 29/843 X |
| 4,928,122 | 5/1990 | Doi et al. | 346/160 |
| 4,965,227 | 10/1990 | Chang et al. | 361/718 X |

*Primary Examiner*—Benjamin R. Fuller
*Assistant Examiner*—David Yockey
*Attorney, Agent, or Firm*—Sughrue, Mion, Zinn, Macpeak & Seas

[57] ABSTRACT

An exposure head for use in an image recording apparatus includes a plurality of light-emitting elements such as LEDs or LDs supported on a support for emitting respective light beams, and a single optical system for focusing the light beams onto a recording medium. The support and the optical system are movable in unison in an auxiliary scanning direction along an image recording drum which is rotatable in a main scanning direction transverse to the auxiliary scanning direction and carries the recording medium wound therearound.

1 Claim, 13 Drawing Sheets

EXPOSURE HEAD FOR IMAGE RECORDING APPARATUS

This is a continuation of application No. 07/323,909 filed Mar. 15, 1989 now U.S. Pat. No. 5,170,180.

BACKGROUND OF THE INVENTION

The present invention relates to an exposure head for use in an image recording apparatus, and more particularly to an exposure head for use in an image recording apparatus, which includes a plurality of light-emitting elements supported on a common support for reproducing an image on a recording medium, and a single optical system for converging light beams from the light-emitting elements onto the recording medium and superposing desired light beams accurately to produce a high-quality image on the image recording medium.

There has been proposed an image recording apparatus for reading color image signals recorded on a recording medium such as a floppy disc, an optical disc, or the like and reproducing a visible color image on another recording medium such as a sheet of photographic paper based on the color image signals.

In the proposed image recording apparatus, a plurality of light-emitting elements capable of emitting lights of different wavelengths are selectively energized in response to input image signals to generate the colors of cyan (C), magenta (M), and yellow (Y) on the color photographic paper.

A color image is reproduced by superposing light beams emitted from the respective light-emitting elements and controlled in their intensity levels on the color photographic paper in one area thereof.

In practice, an exposure head is employed to form a color image on a recording medium such as a sheet of photographic paper. The exposure head includes a plurality of supports supporting respective light-emitting elements and respective condenser optical systems. The supports are supported by a housing in an offset relation to a main scanning direction of the recording medium. The recording medium is wound around an image recording drum, which is then rotated in the main scanning direction, while the housing is moved in an auxiliary scanning direction substantially normal to the main scanning direction to form a two-dimensional color image on the recording medium.

In order to superpose light beams from the light-emitting elements to obtain a desired color, it is necessary to electrically control the timing for the light-emitting elements to emit their light beams dependent on the position where the image is to be recorded. Therefore, a control system required to control the timing is highly complex, and the cost of the entire image recording apparatus is high.

Reproduction of high-quality color images requires that mechanical adjustments should be made to converge the light beams from the light-emitting elements accurately in a desired position on the recording medium, in addition to the electric timing control described above. More specifically, the dimensions of the supports which support the respective light-emitting elements, the positions of the optical systems disposed on the supports, respectively, for converging or focusing the light beams onto the recording medium, and the dimensions of the housing, must be determined highly accurately. As a consequence, the process of manufacturing the exposure head is complex and time-consuming, and it is difficult to produce the exposure head economically.

SUMMARY OF THE INVENTION

It is a major object of the present invention to provide an exposure head for use in an image recording apparatus, which includes a plurality of light-emitting elements for reproducing an image on a recording medium, the light-emitting elements being arrayed in at least a main scanning direction and incorporated in a single support, and a common optical system for converging light beams emitted from the respective light-emitting elements onto the recording medium, so that the exposure head can be electrically controlled and mechanically adjusted simply, and can be manufactured inexpensively, the exposure head can converge or focus light beams emitted from the respective light-emitting elements accurately onto the recording medium, and the exposure head can easily be assembled.

Another object of the present invention is to provide an exposure head for use in an image recording apparatus, comprising: a plurality of light-emitting elements for emitting respective light beams; a support supporting said light-emitting elements; a single optical system for focusing said light beams onto a recording medium; and said support and said optical system being movable in unison in an auxiliary scanning direction relatively with an image recording drum which is rotatable in a main scanning direction transverse to said auxiliary scanning direction and carries the recording medium wound therearound.

Still another object of the present invention is to provide an exposure head wherein said light-emitting elements are disposed on said support at spaced intervals in said main scanning direction.

Yet another object of the present invention is to provide an exposure head wherein said light-emitting elements are provided in three groups, and the light-emitting elements in each of the groups are spaced in the main scanning direction, further including means for selectively superposing the light beams of different wavelengths from said light-emitting elements on said recording medium to form a color image thereon.

Yet still another object of the present invention is to provide an exposure head wherein said support is made of an electrically insulating material, further including first and second electrically conductive base plates mounted on said support in mutually ,electrically insulated relation, said light-emitting elements being provided in different polarity groups which are fixedly mounted on said first and second base plates, respectively.

A further object of the present invention is to provide an exposure head further including a base plate mounted on said support and holding said light-emitting elements, a plurality of electrodes mounted on said base plate and connected to said light-emitting elements, respectively, a holder having a plurality of holes in which said electrodes are fitted, respectively, said holder having electrically conductive areas electrically connected to said electrodes, respectively, and having radially outer ends, and a plurality of lead wires joined to said radially outer ends of the electrically conductive areas and connectable to a control unit.

A still further object of the present invention is to provide an exposure head wherein said holder comprises a printed-circuit board, said electrically conductive areas comprising a plurality of electrically conductive patterns on said printed-circuit board, said electrodes being fitted in radially inner portions of said electrically conductive patterns, said lead wires being soldered to radially outer portions of said patterns.

A yet further object of the present invention is to provide an exposure head further including a base plate mounted on said support and holding said light-emitting elements, a plurality of electrodes mounted on said base plate and connected to said light-emitting elements, respectively, said electrodes having different lengths, and a holder having a plurality of holes positionally aligned with said electrodes, respectively, said electrodes being successively fitted into said holes, in the order from the longest electrode to the shortest electrode, to hold the electrodes on said holder.

A yet still further object of the present invention is to provide an exposure head wherein at least one of said electrodes has a step thereon, said holder being positioned by engagement with said step.

Another object of the present invention is to provide an exposure head wherein said holder comprises a printed-circuit board.

It is also an object of the present invention to provide an exposure head for use in an image recording apparatus, comprising: a plurality of light-emitting elements for emitting respective light beams; a prism for refracting the light beams so as to be superposed on one line, said prism having different refractive indexes with respect to the respective light beams; a support supporting said light-emitting elements at spaced intervals dependent on said refractive indexes; and a single optical system for focusing said light beams simultaneously onto a recording medium at-a prescribed position thereon.

Still another object of the present invention is to provide an exposure head for use in an image recording apparatus, comprising: a plurality of light-emitting elements for emitting respective light beams; a single condenser lens for focusing the light beams on a recording medium, said condenser lens having different refractive indexes with respective to the respective light beams; a support supporting said light-emitting elements at spaced intervals from said condenser lens dependent on said refractive indexes, so that the light beams emitted from said light-emitting elements are focused on positions equally spaced from said condenser lens.

Yet another object of the present invention is to provide an exposure head wherein said support is inclined at a prescribed angle to a direction normal to the optical axis of said condenser lens to position said light-emitting elements at the spaced intervals from said condenser lens.

Yet still another object of the present invention is to provide an exposure head wherein said support has stepped attachment surfaces differently spaced from said condenser lens, said light-emitting elements being mounted on said attachment surfaces, respectively.

A further object of the present invention is to provide an exposure head wherein the light-emitting elements are provided in three groups spaced at intervals corresponding the magnifications by said condenser lens of images formed by the light beams emitted from said light-emitting elements in said groups.

A yet further object of the present invention is to provide an exposure head wherein each of said groups includes at least two light-emitting elements, the light-emitting elements in each of said groups being spaced from each other at intervals corresponding to the magnifications by said condenser lens of images formed by the light beams from said light-emitting elements in each group.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
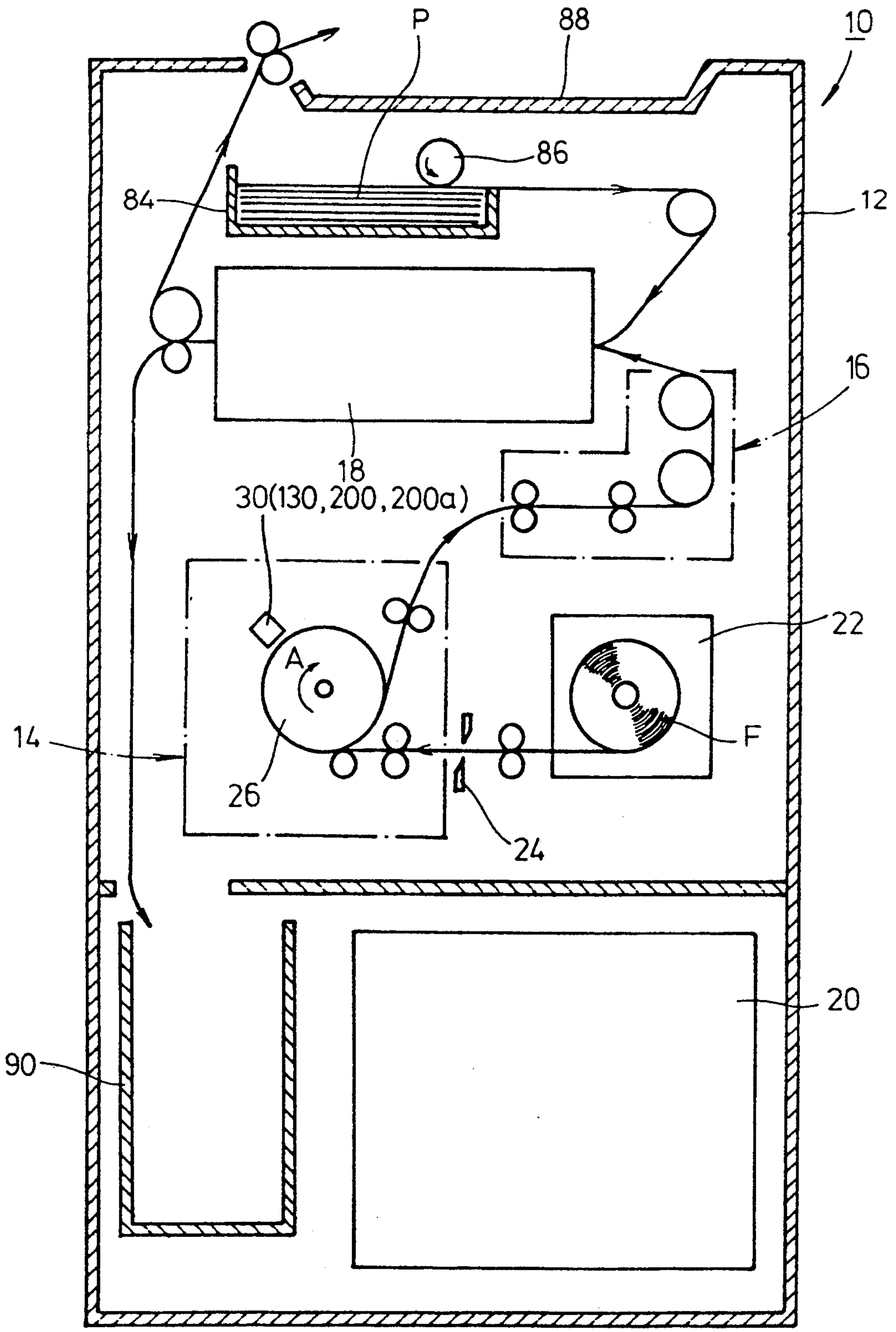
FIG. 1 is a schematic vertical cross-sectional view of an image recording apparatus incorporating an exposure head according to the present invention.

FIG. 1 shows an image recording apparatus incorporating an exposure head according to the present invention. The image recording apparatus includes a main assembly 10 surrounded by a casing 12 and comprising an exposure unit 14, a water applicator unit 16, a thermal development and transfer unit 18, and a control unit 20 for controlling these units 14, 16, 18.

The main assembly 10 also includes a magazine 22 storing a rolled photosensitive member F which can be unwound and fed via a cutter 24 to the exposure unit 14. The exposure unit 14 includes a drum 26 rotatable about its own axis at a high speed in the direction of the arrow A (i.e., main scanning direction), and an exposure head 30 according to the present invention, the exposure head 30 being movable in the direction of the arrow B in FIG. 2 (i.e., auxiliary scanning direction) which is normal to the main scanning direction through wires (not shown).

Figure 2:
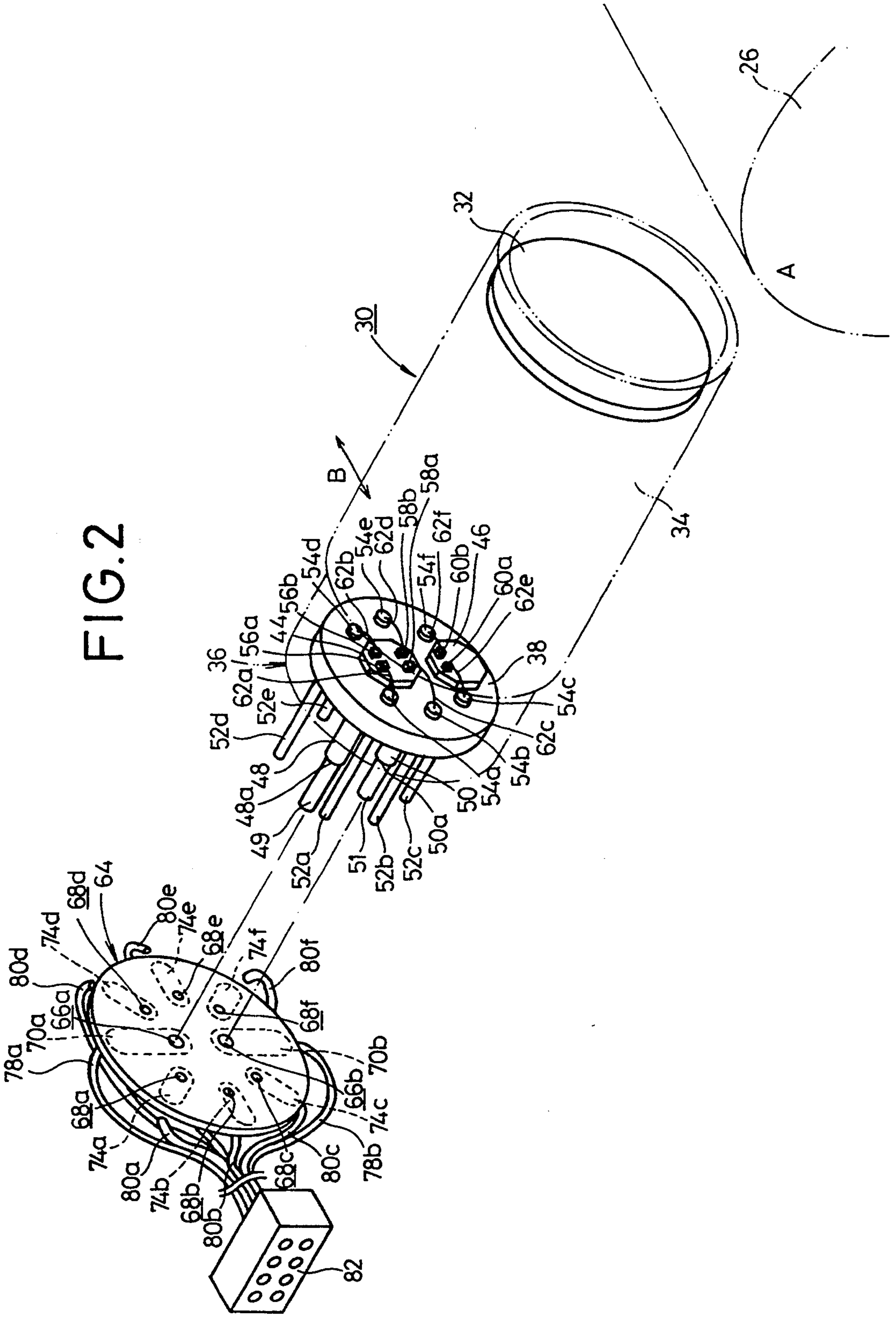
FIG. 2 is a perspective view, partly omitted from illustration, of an exposure head according to a first embodiment of the present invention.
Figure 3:
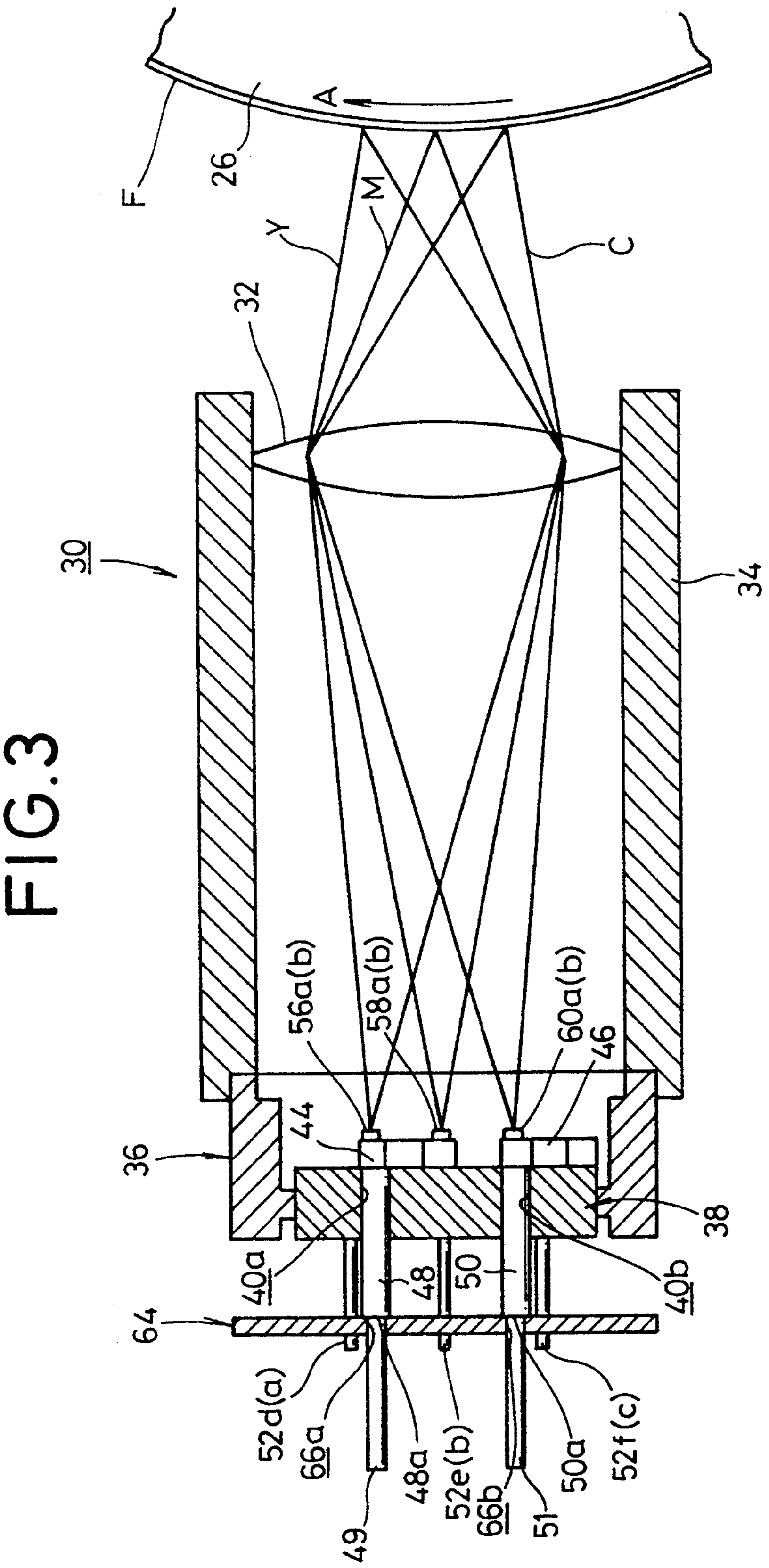
FIG. 3 is a vertical cross-sectional view of the exposure head shown in FIG. 2.

According to a first embodiment of the present invention, the exposure unit 30 includes, as shown in FIGS. 2 and 3, a relatively elongate first cylindrical body 34 with a condenser lens 32 mounted therein, a shorter second cylindrical body 36 fitted in one end of the first cylindrical body 34, and a disc-shaped support 38 fitted in the second cylindrical body 36. The support 38 is made of a heat-resistant electrically insulating material such as a ceramics material or the like, and has relatively large holes 40*a*, 40*b* defined axially therethrough. The support 38 also has six smaller-diameter holes (not shown) positioned on the opposite sides of the holes 40*a*, 40*b* and equally spaced from the center of the support 38.

First and second base plates 44, 46 are mounted on the support 38 in an electrically insulated relation to each other. The first base plate 44 is made of an electrically conductive metallic material and has an octagonal shape. The first base plate 44 includes a first elongate integral heat radiating base 48 fitted in the hole 40*a* in the support 38. The first heat radiating base 48 extends from an end surface of the support 38 and includes an integral smaller-diameter portion 49 joined through a step 48*a*. The second base plate 46 is also made of an electrically conductive metallic material and has an octagonal shape and includes a second elongate integral heat radiating base 50 fitted in the hole 40*b* in the support 38. The second heat radiating base 50 extends from the end surface of the support 38 for the same length as that of the first heat radiating base 48, and includes an integral smaller-diameter portion 51 joined through a step 50*a*. The second heat radiating base 50 is substantially shorter than the first heat radiating base 48.

Figure 4:
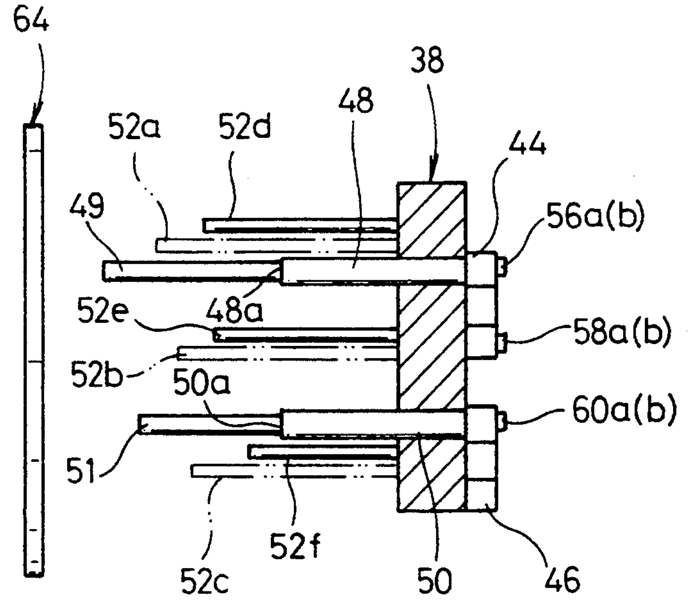
FIG. 4 is an elevational view, partly in cross section, showing the manner in which a printed-circuit board is attached to electrodes of the exposure head.

In the non-illustrated six smaller-diameter holes in the support 38, there are fitted electrode pins 52*a* through 52*f* which are successively shorter and have integral larger-diameter Joints 54*a* through 54*f*, respectively, at their ends. The electrode pin 52*a*, which is the longest of the electrodes pins 52*a* through 52*f*, is shorter than the second heat radiating base 50 (see FIG. 4).

A pair of first LEDs (light-emitting diodes) 56*a*, 56*b* and a pair of second LEDs 58*a*, 58*b* are fixedly mounted on the first base plate 44 at a spaced interval, whereas a pair of third LEDs 60*a*, 60*b* is fixedly mounted on the second base plate 46 in spaced relation to the second LEDs 58*a*, 58*b*. The first LEDs 56*a*, 56*b* emit infrared radiation for causing the photosensitive member F to generate the color of cyan (C). The second LEDs 58*a*, 58*b* emit red light for causing the photosensitive member F to generate the color of magenta (M). The third LEDs 60*a*, 60*b* emit yellow light for causing the photosensitive member F to generate the color of yellow (Y). The LEDs 56*a*, 56*b* are spaced from each other such that light beams emitted therefrom are converged by the condenser lens 32 onto two pixels which are positioned side by side in the auxiliary direction on the photosensitive member F, and so are the LEDs 58*a*, 58*b* and the LEDs 60*a*, 60*b*. The pair of first LEDs 56*a*, 56*b*, the pair of second LEDs 58*a*, 58*b*, and the pair of LEDs 60*a*, 60*b* are spaced such that light beams emitted therefrom are converted by the condenser lens 32 onto positions on the photosensitive member F which are spaced at intervals that are a multiple of the interval between adjacent pixels in the main scanning direction.

The first LEDs 56*a*, 56*b* are electrically connected to the joints 54*a*, 54*d*, respectively, by respective lead wires 62*a*, 62*b*, and the second LEDs 58*a*, 58*b* are electrically connected to the joints 54*b*, 54*e*, respectively, by respective lead wires 62*c*, 62*d*. The third LEDs 60*a*, 60*b* are electrically connected to the joints 54*c*, 54*f*, respectively, by respective lead wires 62*e*, 62*f*.

Figure 5:
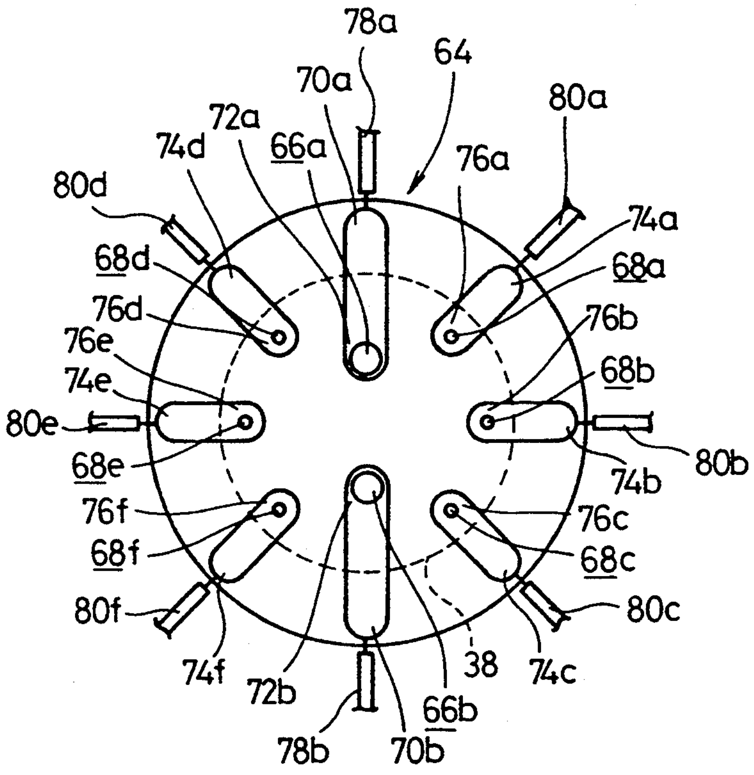
FIG. 5 is a view showing lead wires connected to the printed-circuit board.

A relatively large-diameter disc-shaped printed-circuit board 64 is coupled as a holder to the support 38. More specifically, the printed-circuit board 64 has holes 66*a*, 66*b* defined centrally therein and in which the smaller-diameter portions 49, 51 of the heat radiating bases 48, 50 are fitted, respectively. The printed-circuit board 64 also has smaller-diameter holes 68*a* through 68*f* equally spaced from the center of the printed-circuit board 64 on the opposite sides of the holes 66*a*, 66*b* and in which the electrode pins 52*a* through 52*f* are fitted, respectively. As illustrated in FIGS. 2 and 5, first and second electrically conductive patterns 70*a*, 70*b* are disposed on the printed-circuit board 64 near the center thereof and extend radially outwardly in diametrically opposite relation across the respective holes 66*a*, 66*b*. Third through eighth patterns 74*a* through 74*f* are also disposed on the printed-circuit board 64 equidistantly from the center thereof and extend radially outwardly across the respective holes 68*a* through 68*f*.

To assemble the exposure head 30, the smaller-diameter portions 49, 51 of the heat radiating bases 48, 50 are fitted respectively in the holes 66*a*, 66*b* in the printed-circuit board 64, and the electrode pins 52*a* through 52*f* are inserted in the respective holes 68*a* through 68*f* and soldered to the respective third through eighth patterns 74*a* through 74*f*. Then, lead wires 78*a*, 78*b* with their ends processed as terminals are soldered respectively to the outer ends of the first and second patterns 70*a*, 70*b*, whereas lead wires 80*a* through 80*f* with their ends processed as terminals are soldered respectively to the outer ends of the third through eighth patterns 74*a* through 74*f*. A connector 82 connected to the lead wires 78*a*, 78*b* and 80*a* through 80*f* are now electrically connected to the first LEDs 56*a*, 56*b*, the second LEDs 58*a*, 58*b*, and the third LEDs 60*a*, 67*b*. The connector 82 can be connected to the control unit 20 through another connector (not shown).

As shown in FIG. 1, the water applicator 16 coats moistening water on the exposure surface of the photosensitive member F fed from the exposure unit 14. The photosensitive member F from the water applicator 16 is fed to the thermal development and transfer unit 18. A tray 84 storing a stack of sheet-like image receptive members P is positioned above the thermal development and transfer unit 18. The image receptive members P are fed, one by one, from the tray 84 by a feed roller 86, and delivered to the thermal development and transfer unit 18. In the thermal development and transfer unit 18, the photosensitive member F and the image receptive member P are placed one on the other, and a color image is developed on the photosensitive member F with heat and then transferred from the photosensitive member F to the image receptive member P. A discharge tray 88 is disposed on the upper panel of the casing 12 for receiving the image receptive member P with the transferred color image which has been discharged from the thermal development and transfer unit 18. A waste box 90 is disposed on the bottom of the casing 12 for receiving the photosensitive member F discharged from the thermal development and transfer unit 18.

Figure 6:
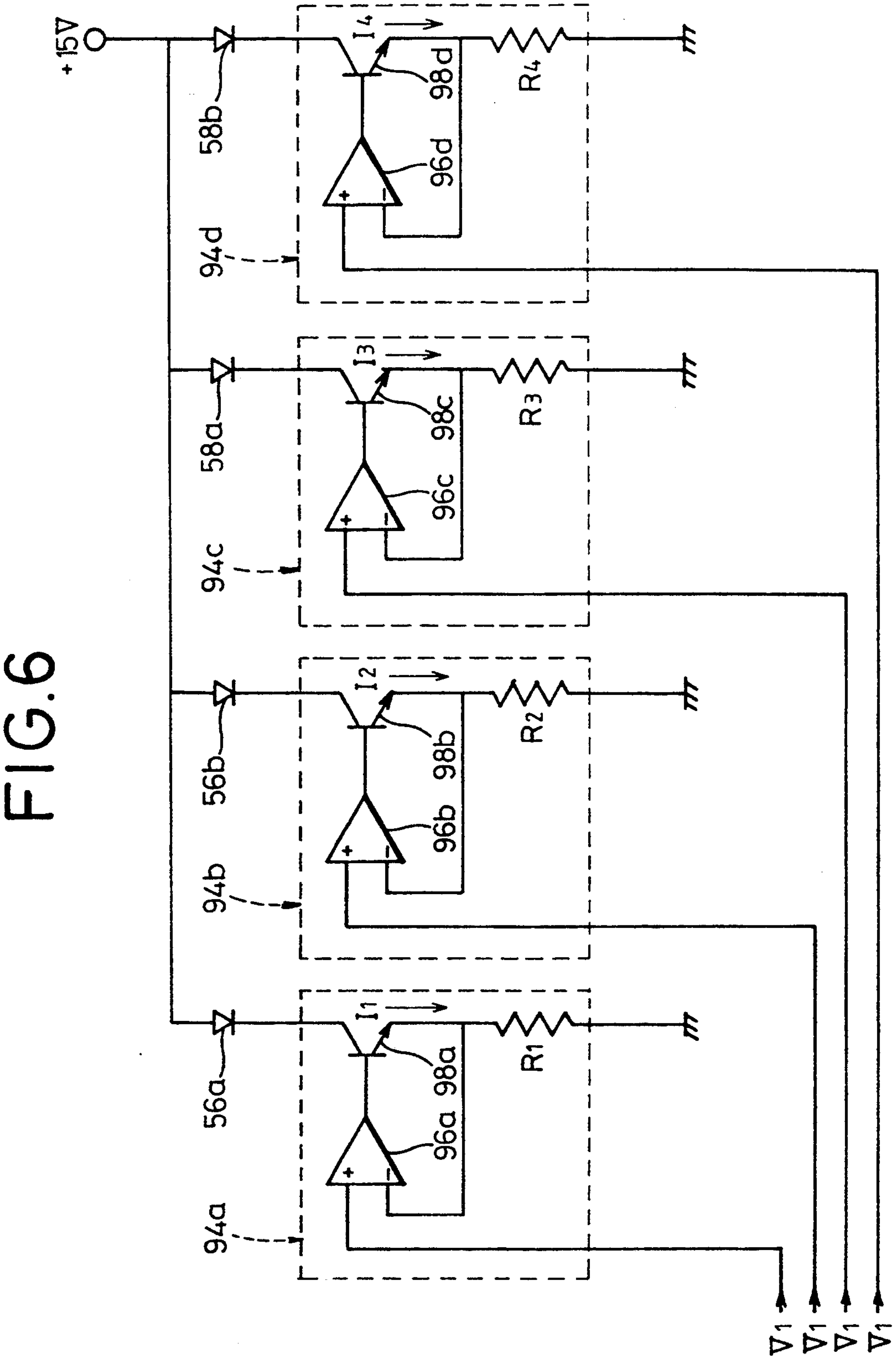
FIGS. 6 and 7 are circuit diagrams of driver circuits for LEDs of the exposure head.
Figure 7:
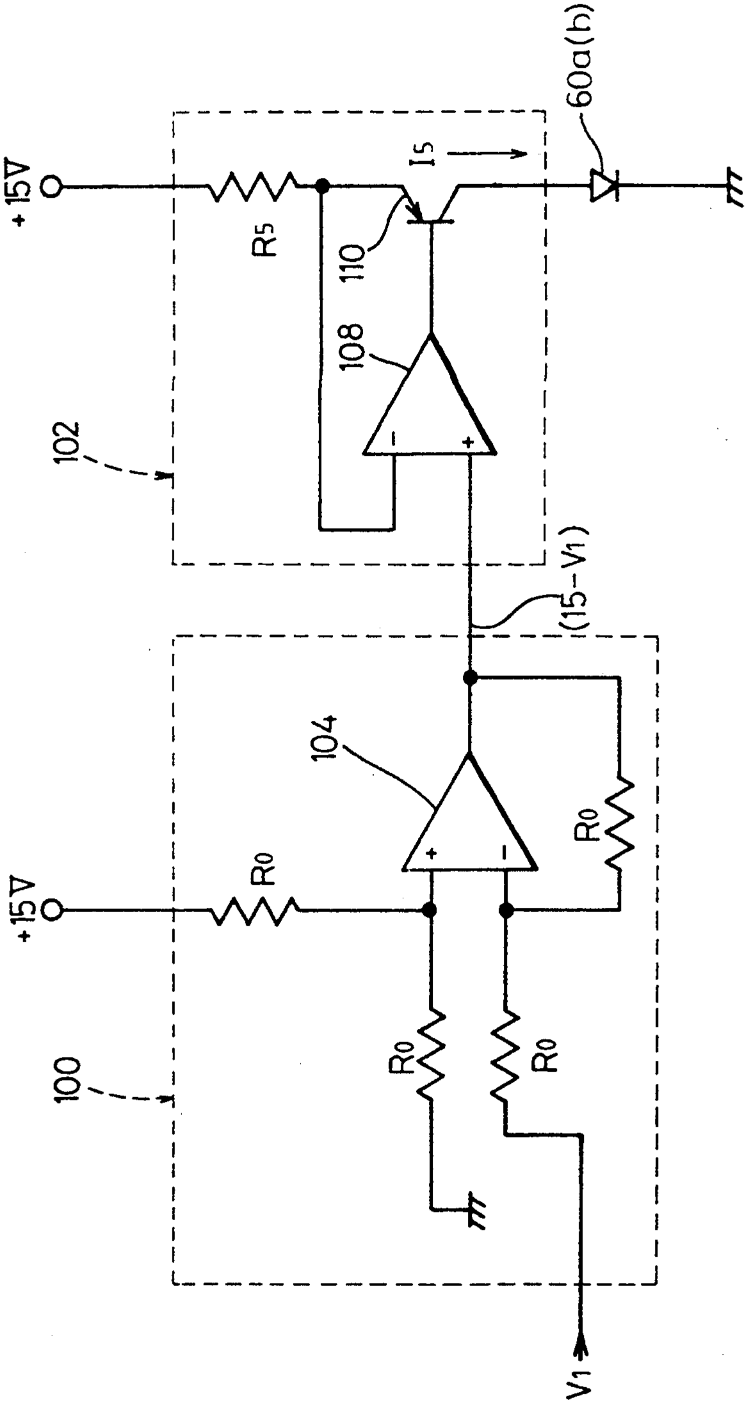

Driver circuits for driving the first LEDs 56*a*, 56*b*, the second LEDs 58*a*, 58*b*, and the third LEDs 60*a*, 60*b* will be described below with reference to FIGS. 6 and 7.

The first LEDs 56*a*, 56*b* and the second LEDs 58*a*, 58*b* have N regions facing toward the condenser lens 32 and P regions fixed directly to the first base plate 44. A power supply (+15 V) is connected to the first heat radiating base 48 integral with the first base plate 44. As shown in FIG. 6, the first LEDs 56*a*, 56*b* and the second LEDs 58*a*, 58*b* are connected respectively to driver circuits 94*a* through 94*d*. The driver circuit 94*a* comprises an operational amplifier 96*a*, a transistor 98*a*, and a resistor $R_1$. Similarly, the driver circuits 94*b* through 94*d* comprise operational amplifiers 96*b* through 96*d*, respectively, transistors 98*b* through 98*d*, respectively, and resistors $R_2$ through $R_4$, respectively. When an input voltage ($V_1$) is applied to the driver circuit 94*a*, an output current ($I_1$) expressed as $V_1/R_1$ are produced from the driver circuit 94*a*. Similarly, when the input voltage ($V_1$) is applied to the other driver circuits 94*b* through 94*d*, these driver circuits 94*b* through 94*d* produce output currents ($I_2$) through ($I_4$) expressed as $V_1/Rj$ (j=2, 3, 4).

The third LEDs 60*a* through 60*b* have P regions facing the condenser lens 32 and N regions fixed to the second base plate 46. The power supply (+15 V) is joined to the second heat radiating base 50 extending from the second base plate 46, and the third LED 60*a* is connected to a level shifting circuit 100 and a driver circuit 102 (see FIG. 7). The level shifting circuit 100 is connected to the power supply (+15 V) shared by the second heat radiating base 50. The level shifting circuit 100 is composed of an operational amplifier 104 and four resistors $R_0$. The driver circuit 102 includes an operational amplifier 108, a transistor 110, and a resistor $R_5$. When the input voltage ($V_1$) is impressed on the level shifting circuit 100, an input voltage ($15-V_1$) is applied to the driver circuit 102, and an output current ($I_5$) from the driver circuit 102 is expressed as $V_1/R_5$. The other third LED 60*b* is also connected to another level shifting circuit and another driver circuit (both not shown), as with the third LED 60*a* shown in FIG. 7.

The exposure head of the first embodiment is basically constructed as described above. Operation and advantages of the exposure head will be described below.

A process of transferring a color image from the photosensitive member F onto,the image receptive member P will be described with reference to FIG. 1.

A photosensitive member F stored in the magazine 22 is fed into the exposure unit 14. When a prescribed length of the photosensitive member F is fed, the trailing end of that length is cut off by the cutter 24. Then, the photosensitive member F fed into the exposure unit 14 is wound around the drum 26, and exposed to-light beams emitted from the first LEDs 56*a*, 56*b*, the second LEDs 58*a*, 58*b*, and the third LEDs 60*a*, 60*b* of the exposure head 30. At this time, pixels in cyan, magenta, and yellow are simultaneously formed on the photosensitive member F by the first LEDs 56*a*, 56*b*, the second LEDs 58*a*, 58*b*, and the third LEDs 60*a*, 60*b*, respectively. Since the first LEDs 56*a*, 56*b*, the second LEDs 58*a*, 58*b*, and the third LEDs 60*a*, 60*b* are spaced at prescribed intervals in the main scanning direction, as described above, rotation of the drum 26 at a high speed in the direction of the arrow A (main scanning direction) causes the colors of cyan, magenta, and yellow to be superposed to form pixels of desired colors. The same LEDs 56*a*, 56*b*, the same LEDs 58*a*, 58*b*, and the same LEDs 60*a*, 60*b* are disposed side by side on the support 38 to form two pixels simultaneously on the photosensitive member F in the auxiliary scanning direction. Therefore, upon movement of the exposure unit 30 in the direction of the arrow B (auxiliary scanning direction), a two-dimensional color image is recorded on the photosensitive member F.

Then, the drum 26 is rotated in the direction opposite to the direction of the arrow A to deliver the photosensitive member F with the color image recorded thereon toward the water applicator 16. The water applicator 16 coats the exposure surface of the photosensitive member F with moistening water, and then delivers the photosensitive member F toward the thermal development and transfer unit 18.

An image receptive member P stored in the tray 84 is fed by the feed roller 86 into the thermal development and transfer unit 18 in which it is superposed on the photosensitive member F. The color image on the photosensitive member F is developed by heating the photosensitive member F, and then transferred onto the image receptive member P. The image receptive member P bearing the transferred color image is discharged into the discharge tray 88, whereas the photosensitive member F is discharged into the waste box 90.

In the first embodiment, the light beams emitted from the first LEDs 56*a*, 56*b*, the second LEDs 58*a*, 58*b*, and the third LEDs 60*a*, 60*b* can be applied to photosensitive member F accurately at a desired position thereon, and the exposure head 30 can be manufactured economically.

More specifically, in the exposure head 30, the first LEDs 56*a*, 56*b*, the second LEDs 58*a*, 58*b*, and the third LEDS 60*a*, 60*b* for generating desired colors on the photosensitive member F are mounted on the single support 38, and the single condenser lens 32 is positioned between the support 38 and the photosensitive member F by the first cylindrical body 34. Therefore, the light beams emitted from the first LEDs 56*a*, 56*b*, the second LEDs 58*a*, 58*b*, and the third LEDs 60*a*, 60*b* are applied via the common condenser lens 32 to the photosensitive member F. Since a plurality of supports and a plurality of condenser lenses are not employed which correspond to the respective LEDs, any complex and time-consuming process of accurately controlling the dimensions of such plural supports and the positions of the condenser lenses is not required. As a result, the exposure head 30 can superpose the colors of cyan, magenta, and yellow accurately on the photosensitive member F at a desired position to produce a high-quality color image thereon. In addition, the exposure head 30 can be assembled simply.

Only the single support 38 and the single condenser lens 32 are required with respect to the plural LEDs 56*a*, 56*b*, 58*a*, 58*b*, 60*a*, 60*b*. Accordingly, the number of components used is much smaller than the conventional exposure head, and hence the exposure head 30 can be manufactured inexpensively.

The first LEDs 56*a*, 56*b* and the second LEDs 58*a*, 58*b*, and the third LEDs 60*a*, 60*b* are substantially different in polarity. In the first embodiment, the first and second base plates 44, 46 are electrically insulated from each other, the first and second LEDs 56*a*, 56*b* , 58*a*, 58*b* are mounted on the first base plate 44 while the third LEDs 60*a*, 60*b* are mounted on the second base plate 46. Then, as shown in FIGS. 6 and 7, the driver circuits 94*a* through 94*d* are connected respectively to the first and second LEDs 56*a*, 56*b*, 58*a*, 58*b*, and the level shifting circuit 100 and the driver circuit 102 are connected to the third LEDs 60*a*, 60*b*. Therefore, the first LEDs 56*a*, 56*b*, the second LEDs 58*a*, 58*b*, and the third LEDs 60*a*, 60*b* can be controlled by the same input voltage ($V_1$), and any control system required to control these LEDs is simplified.

Moreover, the exposure head 30 can be assembled easily and neatly by using the printed-circuit board 64.

More specifically, the first LEDs 56*a*, 56*b*, the second LEDs 58*a*, 58*b*, and the third LEDs 60*a*, 60*b* are positioned at spaced intervals in microns which correspond to the intervals of pixels on the photosensitive member F. Consequently, the electrode pins 52*a* through 52*f* electrically joined to the the first LEDs 56*a*, 56*b*, the second LEDs 58*a*, 58*b*, and the third LEDs 60*a*, 60*b* via the lead wires 62*a* through 62*f* are considerably closely located, and have very small diameters. This means that the heat radiating bases 48, 50, and the six electrode pins 52*a* through 52*f* exist within a considerably small area, and difficulty would be experienced in soldering the lead wires 78*a*, 78*b* and 80*a* through 80*f* directly to the heat radiating bases 48, 50 and the electrode pins 52*a* through 52*f*.

The exposure head 3Q of the present invention employs the printed-circuit board 64 which is larger in diameter than the support 38 and which has the holes 66*a*, 66*b* for receiving the heat radiating bases 48, 50 and the holes 68*a* through 68*f* for receiving the electrode pins 52*a* through 52*f*. As shown in FIG. 5, the printed-circuit board 64 also has the first and second patterns 70*a*, 70*b* extending radially outwardly across the respective holes 66*a*, 66*b* and the third through eighth patterns 74*a* through 74*f* extending radially outwardly across the holes 68*a* through 68*f*, respectively.

The lead wires 78*a*, 78*b* are only required to be soldered to the outer ends of the patterns 70*a*, 70*b* for connection to the heat radiating bases 48, 50. Even where the heat radiating bases 48, 50 are closely positioned, therefore, there is no danger of soldering the heat radiating bases 48, 50 to each other. Likewise, the lead wires 80*a* through 80*f* are soldered to the outer ends of the patterns 74*a* through 74*f*, respectively, for connection to the electrode pins 52*a* through 52*f*. The lead wires 78*a*, 78*b* and 80*a* through 80*f* can thus efficiently and neatly be connected electrically to the heat radiating bases 48, 50 and the electrode pins 52*a* through 52*f*, respectively.

Use of the printed-circuit board 64 prevents the electrode pins 52*a* through 52*f* of very small diameter from being bent or otherwise damaged. Particularly, the printed-circuit board 62 can be attached to the electrode pins 52*a* through 52*f* with utmost ease.

More specifically, as described above, the first heat radiating base 48 is longer than the second heat radiating base 50, and the electrode pins 52*a* through 52*f* disposed outwardly of the heat radiating bases 48, 50 are successively shorter. The electrode pin 52*a* which is the longest of the electrode pins 52*a* through 52*f* is shorter than the second heat radiating base 50. For assembly, the worker fits the smaller-diameter portion 49 of the first heat radiating base 48 into the hole 66*a* in the printed-circuit board 64, and then moves the printed-circuit board 64 and the support 38 relatively toward each other to insert the smaller-diameter portion 51 of the second heat radiating base 50 into the hole 66*b*. Then, the longest electrode pin 52*a* is fitted into the hole 68*a* in the printed-circuit board 64, and the next longest electrode pin 52*b* is fitted into the hole 68*b*. When the end surface of the printed-circuit board 64 abuts against the steps 48*a*, 50*a* of the heat radiating bases 48, 50, all the electrode pins 52*a* through 52*f* are fitted respectively in the holes 68*a* through 68*f*.

After the electrode pins 52*a* through 52*f* are soldered to the respective third through eighth patterns 74*a* through 74*f*, the ends of these electrode pins which project out beyond the printed-circuit board 64 are cut off by nippers or the like. Inasmuch as the printed-circuit board 64 is positioned by engagement,with the steps 48*a*, 50*a* of the heat radiating bases 48, 50, the electrode pins 52*a* through 52*f* can easily and stably be soldered to the third through eighth patterns 74*a* through 74*f*.

As described above, the very thin electrode pins 52*a* through 52*f* are of different lengths, and after the longest electrode pin 52*a* is fitted in the hole 68*a* in the printed-circuit board 64, the other electrode pins 52*b* through 52*f* are successively fitted in the other respective holes 68*b* through 68*f*. Therefore, it is much easier to insert the electrode pins 52*a* through 52*f* into the respective holes 68*a* through 68*f* than would be if the electrode pins 52*a* through 52*f* were of the same length. Even where the thin and many electrode pins 52*a* through 52*f* are employed, since they are inserted one by one into the holes 68*a* through 68*f*, the printed-circuit board 64 can be attached quite simply, and the electrode pins 52*a* through 52*f* are prevented from being bent or damaged by hitting engagement with a side of the printed-circuit board 64. As a consequence, the exposure head 30 can be assembled highly efficiently. The electrode pins 52*a* through 52*f* as soldered in place are firmly held by the printed-circuit board 64 for protection against bending or damage.

Instead of the printed-circuit board 64, a disc-shaped plate larger in diameter than the support 38 may be employed, and electrically conductive members in the form of metallic plates which correspond to the patterns 70*a*, 70*b* and 74*a* through 74*f* may be attached to the disc-shaped plate.

While the first LEDs 56*a*, 56*b*, the second LEDs 58*a*, 58*b*, and the third LEDs 60*a*, 60*b* are employed as light-emitting elements in the above embodiment, LDs (laser diodes) may be used as light-emitting elements. The exposure head 30 has been described as reproducing color images. However, the exposure head 30 may be used to reproduce monochromatic images.

Figure 8:
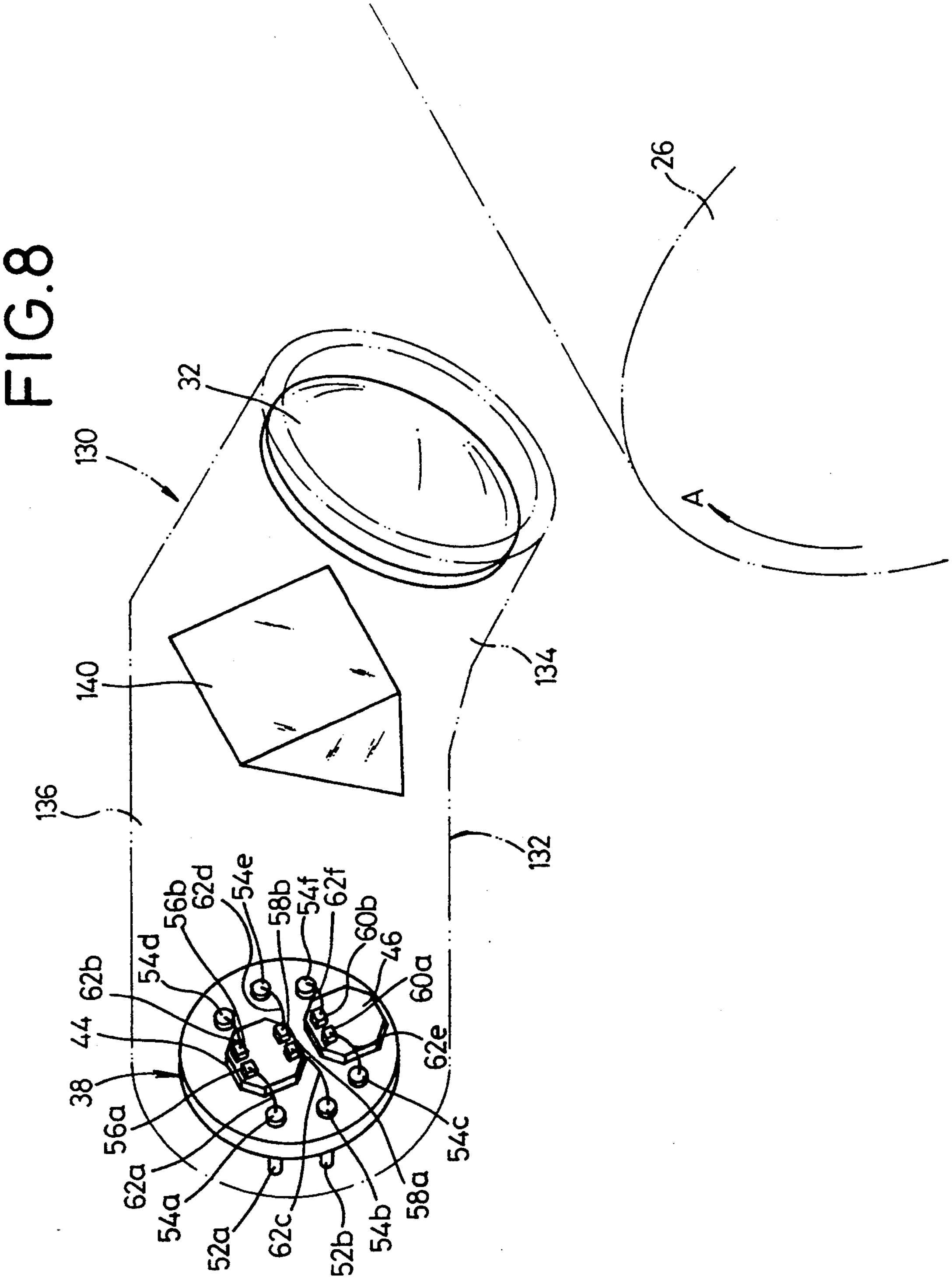
FIG. 8 is a perspective view, partly omitted from illustration, of an exposure head according to a second embodiment of the present invention.
Figure 9:
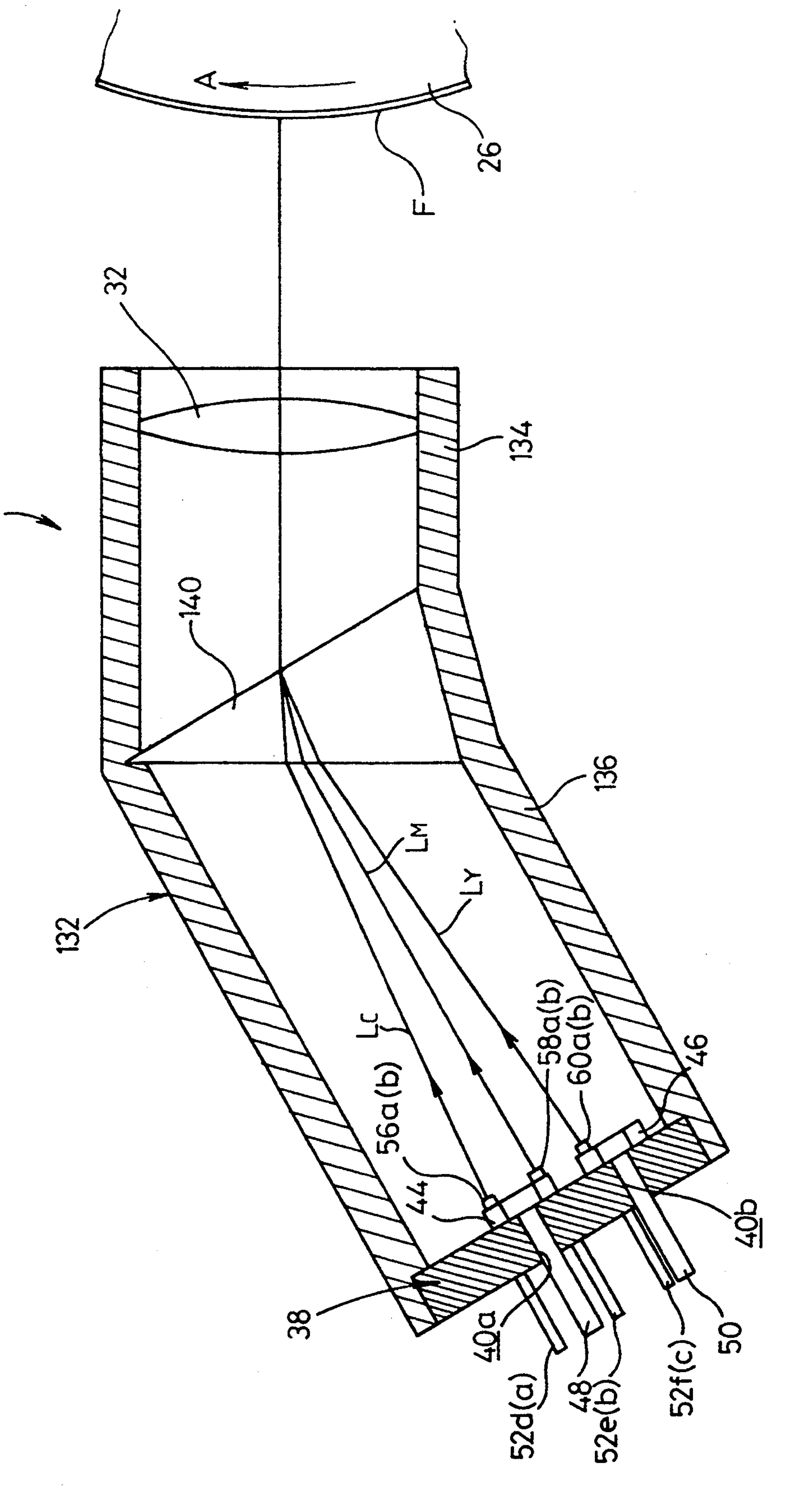
FIG. 9 is a vertical cross-sectional view of the exposure head illustrated in FIG. 8.

An exposure head 130 according to a second embodiment of the present invention is illustrated in FIGS. 8 and 9. Those parts of the exposure head 130 which are identical to those of the exposure head 30 are denoted by identical reference numerals, and will not be described in detail.

The exposure head 130 has a housing 132 including a relatively short first cylindrical portion 134 and a relatively long second cylindrical portion 136 integrally joined to an end of the first cylindrical portion 134 and inclined at a prescribed angle to the first cylindrical portion 134. The condenser lens 32 is mounted in the first cylindrical portion 134. A prism 140 is disposed in the housing 132 where the first and second cylindrical portions 134, 136 are obliquely joined to each other, the prism 140 having a relatively high dispersion.

The first LEDs 56*a*, 56*b*, the second LEDs 58*a*, 58*b*, and the third LEDs 60*a*, 60*b* which are supported by the support 38 are disposed in the second cylindrical portion 136. The first LEDs 56*a*, 56*b*, the second LEDs 58*a*, 58*b*, and the third LEDs 60*a*, 60*b* are angularly positioned with respect to the prism 140 such that light beams $L_C$ emitted from the first LEDs 56*a*, 56*b*, light beams $L_M$ emitted from the second LEDs 58*a*, 58*b*, and light beams $L_Y$ emitted from the third LEDs 60*a*, 60*b* are refracted by the prism 140 so as to be superposed on one line.

More specifically, the light beams $L_C$ have a wavelength of 805 nm, the light beams $L_M$ a wavelength of 660 nm, and the light beams $L_Y$ a wavelength of 570 nm. Therefore, the prism 140 has different refractive indexes with respect to these light beams $L_C$, $L_M$, $L_Y$, the refractive index for the light beam $L_Y$ of the shortest wavelength being largest and the refractive index for the light beam $L_C$ of the longest wavelength being smallest. By selecting the angular positions of the first LEDs 56*a*, 56*b*, the second LEDs 58*a*, 58*b*, and the third LEDs 60*a*, 60*b* with respect to the prism 140 dependent on the refractive indexes for the light beams $L_C$, $L_M$, $L_Y$, the light beams $L_C$, $L_M$, $L_Y$ are refracted by the prism 140 so as to travel along one line.

According to the second embodiment, since the light beams $L_C$, $L_M$, $L_Y$ emitted from different positions are refracted by the prism 140 to travel along one line, no complex electric controls are required, unlike the conventional arrangement in which the emitted light beams would be converged onto different positions on the photosensitive member, and the light beams of different colors are accurately superposed in one position on the photosensitive member. Consequently, highly accurate color images free of color shifts or blurs can be reproduced easily and reliably. Any control system required for reproducing enlarged or reduced images is simplified.

The six LEDs 56*a*, 56*b*, 58*a*, 58*b*, 60*a*, 60*b* are mounted in the single housing 132, and the single prism 140 and the single condenser lens 32 are provided for these LEDs. Thus, the number of components used is reduced greatly, making it possible to manufacture the exposure head 130 inexpensively.

With the prism 140 being of a high dispersion, the distance between the prism 140 and the support 38 can be reduced, and the exposure head 130 may be smaller in size.

The LEDs 56*a*, 56*b*, 58*a*, 58*b*, 60*a*, 60*b* may be of an elongate rectangular shape, and may be oriented such that their transverse direction is aligned with the main scanning direction. With this arrangement, the distances between the first LEDs 56*a*, 56*b*, the second LEDs 58*a*, 58*b*, and the third LEDs 60*a*, 60*b* are reduced, allowing the support 38 to be positioned closely to the prism 140. Accordingly, the exposure head 130 may further be reduced in size.

While the support 38 is shown as lying perpendicularly to the central axis of the second cylindrical portion 136, the support 38 may be inclined to the central axis of the second cylindrical portion 136 to cancel out the differences between the focal lengths of the condenser lenses 32 with respect to the light beams $L_C$, $L_M$, $L_Y$ of the three colors, so that these light beams can be converged more accurately onto one spot.

Figure 10:
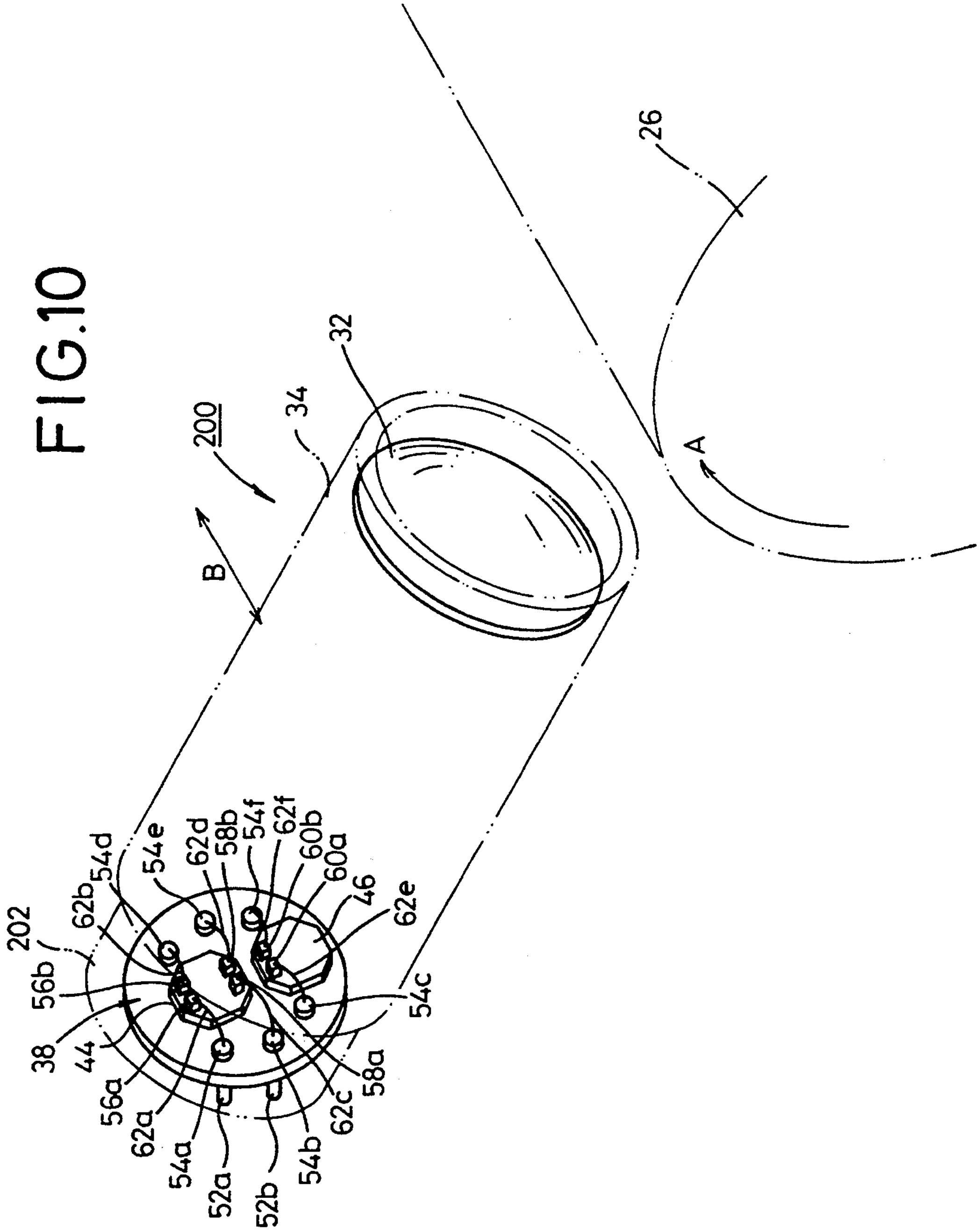
FIG. 10 is a perspective view, partly omitted from illustration, of an exposure head according to a third embodiment of the present invention.
Figure 11:
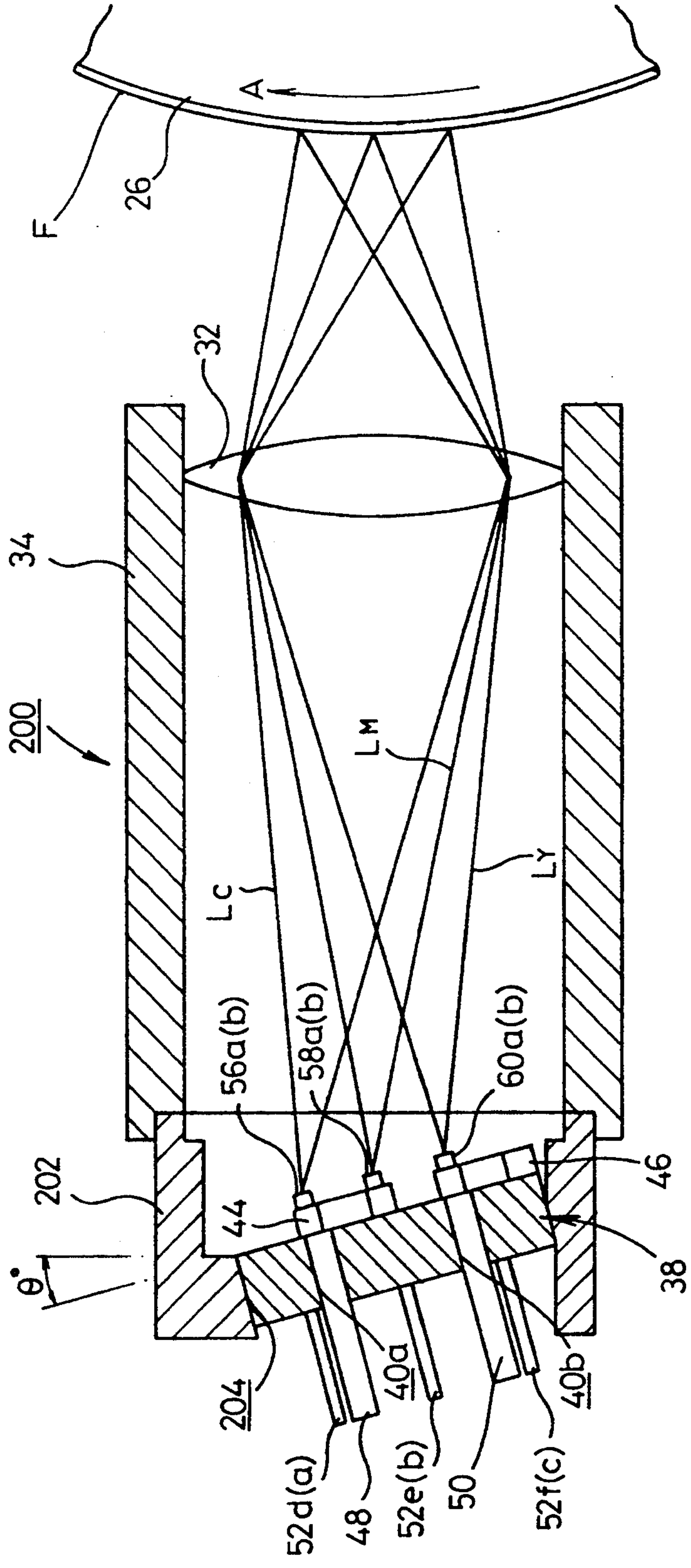
FIG. 11 is a vertical cross-sectional view of the exposure head illustrated in FIG. 10.
Figure 12:
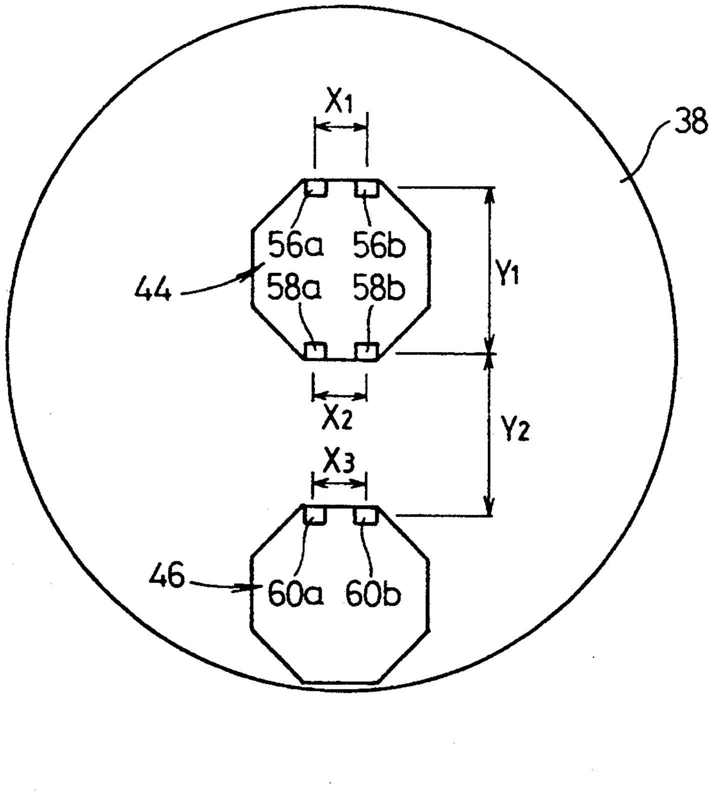
FIG. 12 is a view showing LEDs fixedly mounted on base plates of the exposure head of FIG. 10.

FIGS. 10 through 12 show an exposure head 200 according to a third embodiment of the present invention. Those parts of the exposure head 200 which are identical to those of the exposure head 30 of the first embodiment are denoted by identical reference numerals, and will not be described in detail.

As shown in FIG. 11, the exposure head 200 has a relatively short second cylindrical body 202 fitted in one end of the first cylindrical body 34 and having a hole 204 with its axis inclined at a prescribed angle to the axis of the second cylindrical body 202. The support 38 is fitted in the hole 204 and hence inclined at angle of $\theta°$ to a direction normal to the optical axis of the condenser lens 32 mounted in the first cylindrical body 34.

As illustrated in FIG. 12, the pair of first LEDs 56*a*, 56*b* and the pair of second LEDs 58*a*, 58*b* are fixedly mounted on the first base plate 44 and spaced from each other by a distance of $Y_1$, whereas the pair of third LEDs 60*a*, 60*b* is disposed on the second base plate 46 and spaced from the second LEDs 58*a*, 58*b* by a distance of $Y_2$. The LEDs 56*a*, 56*b* are spaced from each other by a distance of $X_1$, so that light beams emitted therefrom are converged onto two respective pixels that are adjacent to each other in the auxiliary scanning direction (indicated by the arrow B in FIG. 10). The second LEDs 58*a*, 58*b* and the third LEDs 60*a*, 60*b* are similarly spaced by distances of $X_2$, $X_3$, respectively.

A disc (not shown) having an opening may be disposed between the support 38 and the condenser lens 32 closely to the LEDs 56*a*, 56*b*, 58*a*, 58*b*, 60*a*, 60*b* to prevent flare from being produced.

In the third embodiment, the light beams $L_C$, $L_M$, $L_Y$ of different wavelengths emitted respectively from the first LEDs 56*a*, 56*b*, the second LEDs 58*a*, 58*b*, and the third LEDs 60*a*, 60*b* can reliably be converged onto the photosensitive member F through the single condenser lens 32.

Figure 13:
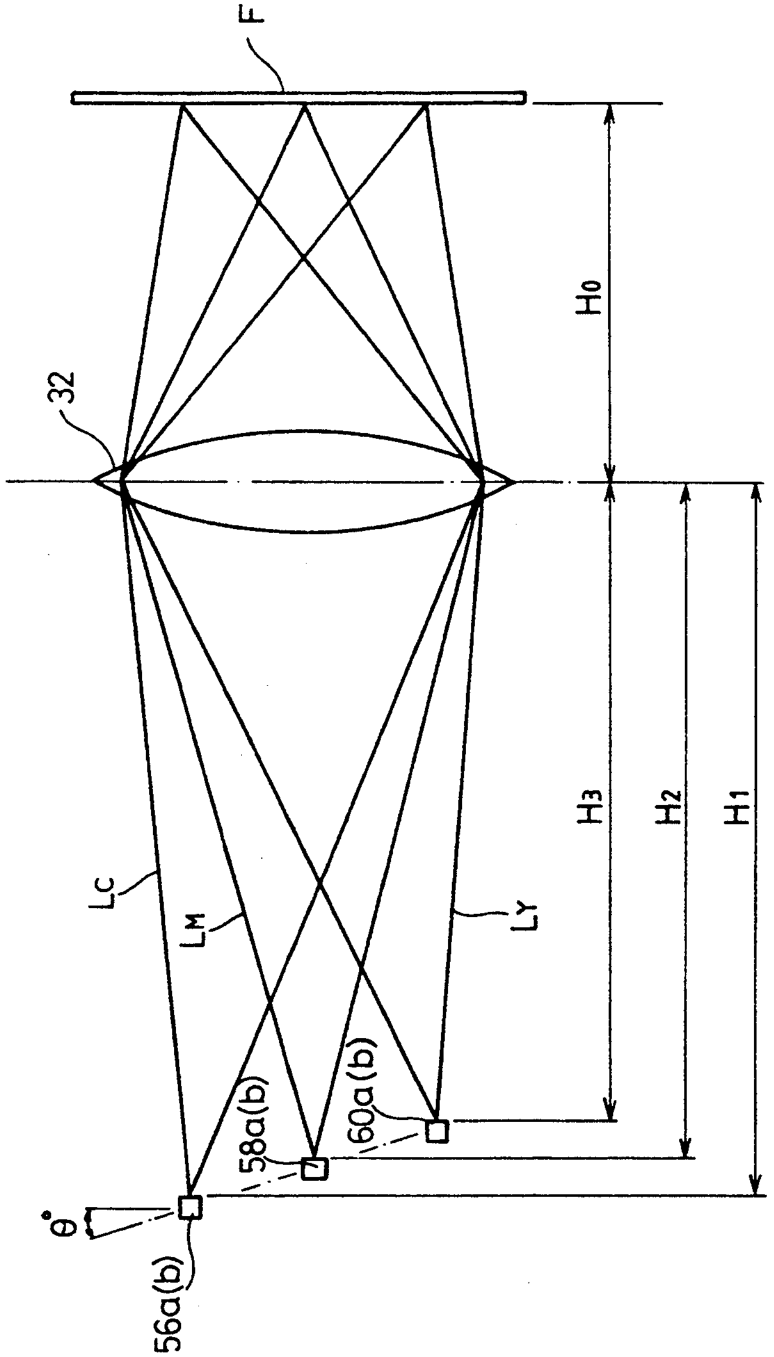
FIG. 13 is a diagram illustrating the positional relationship between a condenser lens and LEDs in the exposure head of FIG. 10.

More specifically, the light beams $L_C$ have a wavelength of 805 nm, the light beams $L_M$ a wavelength of 660 nm, and the light beams $L_Y$ a wavelength of 570 nm. Therefore, the condenser lens 32 has different refractive indexes with respect to these light beams $L_C$, $L_M$, $L_Y$, the refractive index for the light beam $L_Y$ of the shortest wavelength being largest and the refractive index for the light beam $L_C$ of the longest wavelength being smallest. The Condenser lens 32 has focal lengths $f_C$, $f_M$, $f_Y$ with respect to the light beams $L_C$, $L_M$, $L_Y$, respectively, the focal lengths being of the relationship: $f_C > f_M > f_Y$. The support 38 is inclined at $\theta°$ to the direction normal to the optical axis of the condenser lens 32, and the first LEDs 56*a*, 56*b*, the second LEDs 58*a*, 58*b*, and the third LEDs 60*a*, 60*b* are spaced from the condenser lens 32 by respective distances of $H_1$, $H_2$, $H_3$ (see FIG. 13). With respect to the light beams $L_C$, the following relationship is established:

$$\frac{1}{H_1} + \frac{1}{H_0} = \frac{1}{f_C} \tag{1}$$

With respect to the other light beams $L_M$, $L_Y$, the following relationships are established:

$$\frac{1}{H_2} + \frac{1}{H_0} = \frac{1}{f_M} \tag{2}$$

$$\frac{1}{H_3} + \frac{1}{H_0} = \frac{1}{f_Y} \tag{3}$$

where $H_0$ indicates the distance between the condenser lens 32 and the photosensitive member F. The distances $H_1$, $H_2$, $H_3$ can be determined from the above equations (1) through (3).

By thus positioning the first LEDs 56*a*, 56*b*, the second LEDs 58*a*, 58*b*, and the third LEDs 60*a*, 60*b*, the light beams $L_C$, $L_M$, $L_Y$ are converged or focused by the condenser lens 32 onto a spot which is spaced from the condenser lens 32 by the distance $H_0$. As a result, the light beams $L_C$, $L_M$, $L_Y$ can reliably be focused on the photosensitive member F at a prescribed area to form a high-quality color image with ease.

Since the first LEDS 56*a*, 56*b*, the second LEDs 58*a*, 58*b*, and the third LEDs 60*a*, 60*b* are spaced from the condenser lens 32 by the distance $H_1$, $H_2$, $H_3$, respectively, the magnifications of the images formed by the light beams $L_C$, $L_M$, $L_Y$ are different from each other. In the third embodiment, however, the light beams $L_C$, $L_M$, $L_Y$ can be applied to the photosensitive member F at desired pixel-to-pixel intervals in the main and auxiliary scanning directions.

More specifically, the magnification $m_1$ of the image formed by the light beams $L_C$ is indicated by $H_0/H_1$, and the magnifications $m_2$, $m_3$ of the images formed by the light beams $L_M$, $L_Y$ are indicated by $H_0/H_2$, $H_0/H_3$, respectively. In order for the light beams $L_C$ emitted from the first LEDs 56*a*, 56*b* to be applied to two adjacent pixels in the auxiliary scanning direction, the following relationship should be met:

$$X_1 \cdot m_1 = P_1 \tag{4}$$

(where $P_1$ is the pixel-to-pixel pitch or interval in the auxiliary scanning direction). The distance $X_1$ can substantially be determined from the following equation (5):

$$X_1 = \frac{P_1}{m_1} = \frac{H_1}{H_0} \cdot P_1 \tag{5}$$

The distance $X_2$ between the second LEDs 58*a*, 58*b*, and the distance $X_3$ between the third LEDs 60*a*, 60*b* can be given by the following equations:

$$X_2 = \frac{P_1}{m_2} = \frac{H_2}{H_0} \cdot P_1 \tag{6}$$

$$X_3 = \frac{P_1}{m_3} = \frac{H_3}{H_0} \cdot P_1 \tag{7}$$

Likewise, in order for the light beams $L_C$, $L_M$, $L_Y$ emitted from the first LEDs 56*a*, 56*b*, the second LEDs 58*a*, 58*b*, and the third LEDs 60*a*, 60*b* to be applied to positions spaced at intervals which are a multiple of the distances between pixels in the main scanning direction, it is necessary to meet the following equations, with the second LEDs 58*a*, 58*b* positioned on the optical axis:

$$X_1 \cdot m_1 = Y_2 \cdot m_3 = n \cdot P_2 \tag{8}$$

$$\frac{Y_1}{H_1} = \frac{Y_2}{H_3} = n \cdot P_2$$

(where $P_2$ represents the pixel-to-pixel pitch in the main scanning direction, $n=1, 2, \ldots$). Therefore, the distances $Y_1$, $Y_2$ should be selected to meet the equation (8).

Therefore, the light beams $L_C$, $L_M$, $L_Y$ are accurately applied to a desired position on the photosensitive member F, so that a highly accurate color image can easily and efficiently be formed on the photosensitive member F.

Figure 14:
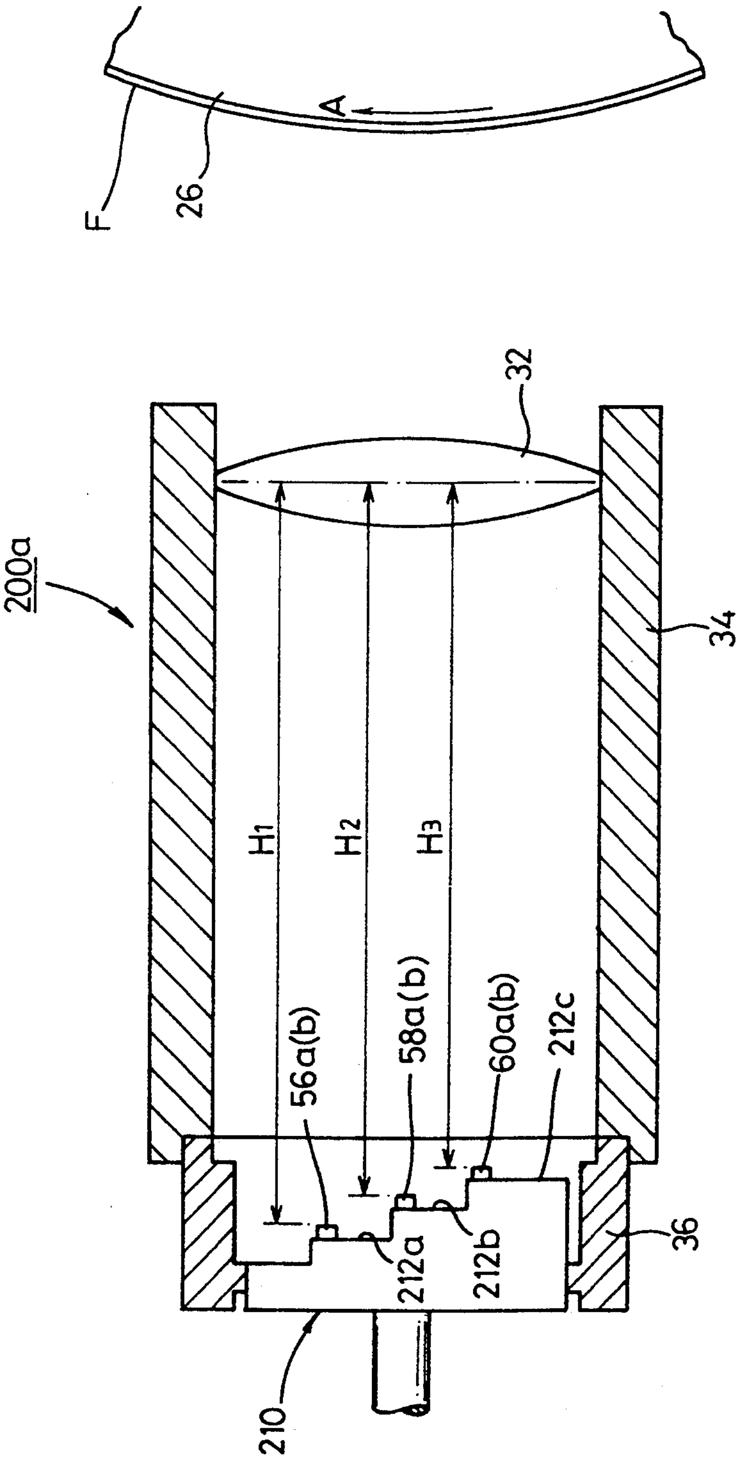
FIG. 14 is a vertical cross-sectional view of an exposure head in accordance with a fourth embodiment of the present invention.

An exposure head 200*a* according to a fourth embodiment of the present invention is illustrated in FIG. 14. Those parts of the exposure head 200*a* which are identical to those of the exposure head 30 of the first embodiment are denoted by identical reference numerals, and will not be described in detail.

The exposure head 200*a* includes a support 210 fitted coaxially in the second cylindrical body 36. The support 210 has stepped attachment surfaces 212*a*, 212*b*, 212*c* projecting toward the first cylindrical body 34. The first LEDs 56*a*, 56*b* are mounted on the attachment surface 212*a*, and the second LEDs 58*a*, 58*b* and the third LEDs 60*a*, 60*b* are mounted respectively on the attachment surfaces 212*b*, 212*c*. As with the exposure head 200 of the third embodiment, the first LEDs 56*a*, 56*b*, the second LEDs 58*a*, 58*b*, and the third LEDs 60*a*, 60*b* are spaced from the condenser lens 32 by the distances $H_1$, $H_2$, $H_3$, respectively.

It can readily be understood that the exposure head 200*a* operates in the same manner and offers the same advantages as the exposure head 200 of the third embodiment.

With the present invention, as described above, a plurality of light-emitting elements are mounted on one support, and light beams emitted from the light-emitting elements are converged or focused onto a recording medium by a single optical system. Since the light beams from the light-emitting elements are converged by the single optical system, they can accurately be applied to the recording medium at a desired position thereon. The desired light beams can reliably be superposed on each other to produce a high-quality color image efficiently. Since a plurality of supports and a plurality of optical systems are not required with respect to the respective light-emitting element, the number of components required is reduced, and an exposure head can be manufactured inexpensively.

Moreover, electrodes connected to the respective light-emitting elements are fitted in respective holes defined in a holder, and the holder has electrically conductive areas extending radially outwardly and electrically connected to the electrodes, respectively, with lead wires being soldered to the outer ends of these electrically conductive areas. Even where the electrodes are disposed in a small space, the electrodes are prevented from being electrically connected to each other by an erroneous soldering process, and the lead wires can be connected to the respective electrodes highly easily and reliably. Therefore, the exposure head can be assembled simply and efficiently.

The electrodes connected to the light-emitting elements are of different lengths and are successively fitted into the respective holes in the holder which comprises a printed-circuit board. Since the electrodes are inserted one by one into the respective holes, it is not necessary to bring the thin and many electrodes into simultaneous alignment with the holes, respectively, but the printed-circuit board can be attached to the electrodes easily in a short period of time. With the electrodes firmly held by the printed-circuit board, they are prevented from being bent or otherwise damaged.

The light-emitting elements for emitting light beams of different wavelengths to reproduce a color image are mounted on the support. The light beams emitted from the respective light-emitting elements are refracted by a prism so as to be superposed on one line, and then are converged or focused simultaneously onto the recording medium. Accordingly, no complex electric controls are required, and the light beams of different colors from the light-emitting elements can accurately be applied to a desired spot on the recording medium. Thus, a highly accurate color image can easily and efficiently be formed by these light beams.

Furthermore, the light-emitting elements for emitting light beams of different wavelengths are mounted on the single support, and spaced from the optical system by respective distances dependent on the refractive indexes of the optical system with respect to the light beams, so that the light beams are focused on positions equally spaced from the optical system. Therefore, the light beams emitted from the respective light-emitting elements are accurately focused on prescribed positions on the recording medium to produce a high-quality color image with ease. The exposure head can be manufactured economically without employing an expensive achromatic lens.

Although certain preferred embodiments have been shown and described, it should be understood that many changes and modifications may be made therein without departing from the scope of the appended claims.

What is claimed is:

1. An exposure head for use in an image recording apparatus, comprising:

a plurality of light-emitting elements for emitting respective light beams;

a single support for supporting and accommodating said light-emitting elements, wherein said support is made of an electrically insulating material, further including first and second electrically conductive base plates mounted on said support in mutually electrically insulated relation, said light-emitting elements being provided in different polarity groups which are fixedly mounted on said first and second base plates, respectively, said light-emitting elements being disposed in a side-by-side relationship on said single support and said light-emitting elements are provided in three groups, and the light emitting elements in each of the groups are at spaced intervals in a main scanning direction, wherein said light beams emitted by each of said groups of light-emitting elements have a different wavelength, said exposure head further including means for selectively superposing the light beams having different wavelengths from said light-emitting elements on a recording medium to form a color image thereon; and a single optical system for simultaneously focusing said light beams onto said recording medium, said single optical system including only one condenser lens, said condenser lens focusing each of said light beams emitted by the light-emitting elements, said single support and said single optical system being mechanically coupled to each other in a relative fixed position thereof and allow said single support and said single optical system to move in unison in an auxiliary scanning direction relative to an image recording drum which is rotatable in said main scanning direction transverse to said auxiliary scanning direction, wherein said drum carries the recording medium wound therearound.

* * * * *